Nov. 13, 1923.
E. W. ROBERTS
1,474,004
CANDY CUTTING APPARATUS
Filed July 24, 1922
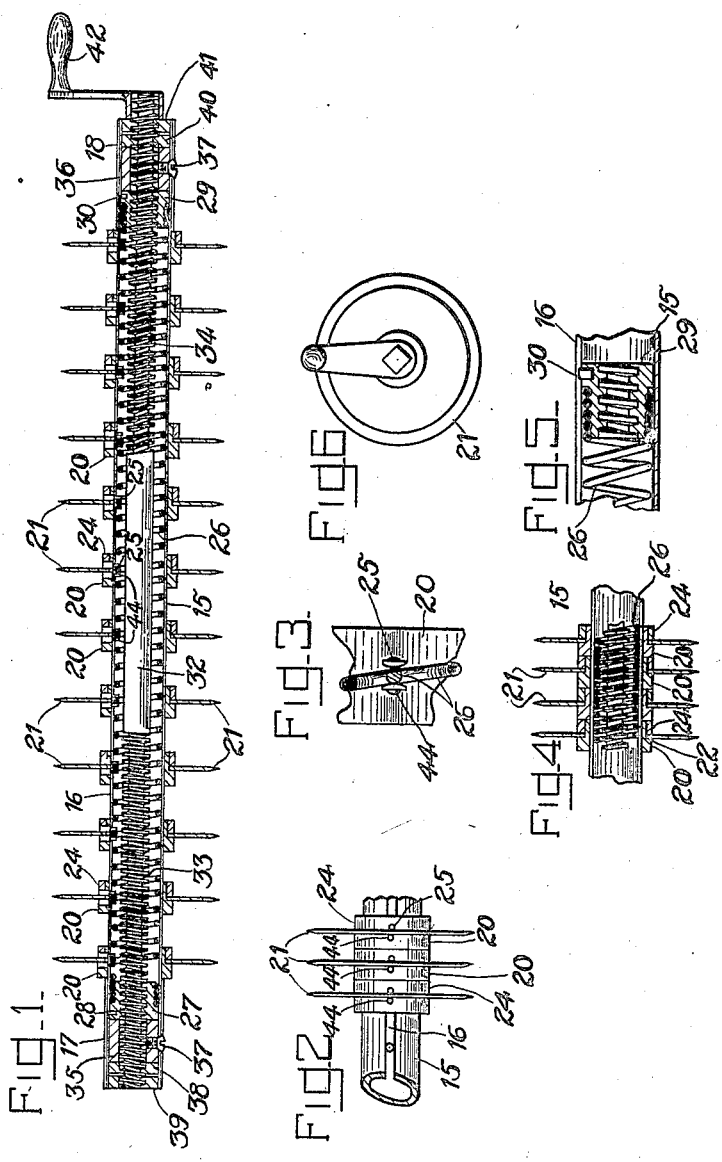
Edmund W. Roberts INVENTOR.
BY C. W. Miles, ATTORNEY.

Patented Nov. 13, 1923.

1,474,004

UNITED STATES PATENT OFFICE.

EDMUND W. ROBERTS, OF CINCINNATI, OHIO.

CANDY-CUTTING APPARATUS.

Application filed July 24, 1922. Serial No. 577,025.

*To all whom it may concern:*

Be it known that I, EDMUND W. ROBERTS, a citizen of the United States, residing at Cincinnati, in the county of Hamilton and State of Ohio, have invented certain new and useful Improvements in Candy-Cutting Apparatus, of which the following is a specification.

My invention relates to improvements in apparatus to cut candy and similar substances into a plurality of rectangular pieces. One of its objects is to provide a cutting apparatus adapted to be conveniently applied to cut sheets of candy into rectangular pieces. Another object is to provide improved means to enable cutting apparatus to be quickly and readily adjusted to cut the sheets into pieces of different dimensions as may be required. Another object is to provide improved apparatus to enable the cutting apparatus to be readily adjusted to accurately cut sheets into pieces of different dimensions. My invention also comprises certain details of form and relation of component members, all of which will be fully set forth in the description of the accompanying drawings in which:

Fig. 1, is a central vertical section through a cutting apparatus embodying my invention, with the cutters spread to cut a sheet into relatively large sized pieces.

Fig. 2, is a detail side elevation of a portion of the cutter of Fig. 1, showing the cutters adjusted close together to enable a sheet to be cut into relatively small pieces.

Fig. 3, is a detail view illustrating the connection between the respective cutter blades and the coiled spring by means of which the cutters are adjusted to and from each other.

Fig. 4 is a central vertical sectional detail with the knives adjusted close together as shown in Fig. 2.

Fig. 5, is a sectional detail illustrating the connection or anchoring of the coiled spring at its opposite ends.

Fig. 6, is an end view of Fig. 1.

The accompanying drawings illustrate the preferred embodiments of my invention in which 15 represents a tube, preferably of metal, having a slot 16 longitudinally thereof through the major and central portion thereof. Opposite ends 17 and 18 of the tube 15 serve as handles by means of which the apparatus is applied in a manner somewhat similar to that of a baker's rolling pin to perform the cutting operation.

A series of sleeves or collars 20 are mounted upon the exterior of the tube 15 and are adjustable longitudinally of said tube. A series of disks 21 having their peripheries sharpened to serve as rotary cutters or knives are centrally perforated and mounted upon the respective collars against shoulders 22 of said collars. A series of sleeves or nuts 24 are slipped or threaded upon the reduced portions of the collars so as to engage the opposite sides of said disks 21 and clamp the disks 21 in place upon the collars 20. It is not essential to the operation of my improved apparatus that the disks should be non-rotatably clamped to the collars 20, but I preferably clamp them non-rotatably upon the collars 20. The sleeves or nuts 24 are rigidly locked to the collars 20 by means of pins 25 which penetrate radially through both the sleeves 24 and the collars 20 and each project for a short distance through the slot 16 and into the interior of the tube 15 a sufficient distance to each engage on one side of one of the loops of a coiled spring 26 which fits rather snugly to the inner wall of the tube 15. At the left hand end of the tube 15 is a nut 27 having a pin 28 projecting into the slot 16 whereby the nut 27 is enabled to move endwise of the tube 15, but is not rotatable relative to the tube 15. A portion of the nut 27 fits rather snugly to the inner wall of the tube 15, while several turns of the left hand end of the coiled spring 26 are slipped upon a reduced portion of the nut 27 and rigidly attached thereto, as for instance by brazing thereto. A nut 29 similar to nut 27 is similarly mounted in the right hand end of the tube 15 and held against rotation by means of a pin 30. The right hand end of the coiled spring 26 is similarly rigidly attached to the nut 29.

A rod or shaft 32 has right and left hand threads 33 and 34 cut upon opposite ends thereof and the nuts 27 and 29 are correspondingly internally threaded and engaged respectively by the threads 33 and 34 of said shaft 32. At opposite ends of the tube 15 are sleeves 35 and 36 each rigidly attached to the tube 15 by a set screw 37. The sleeves 35 and 36 are smooth bored and form journal boxes to support and journal the shaft 32 at opposite ends relative to the tube 15. A pair of lock nuts 38 and 39 are mounted and locked upon the end of shaft 32 out side of the journal box 35 and a pair of lock nuts 40 and 41 are mounted and locked upon the opposite end of the shaft 32. The end of shaft 32 projects beyond the lock nut 41 a sufficient distance to have a hand crank 42 detachably applied thereto to enable the shaft 32 to be turned in either direction thereby to adjust the nuts 27 and 29 either toward each other or away from each other as desired to thereby adjust the knives 21 nearer together or further apart upon the tube 15. The coiled spring 32 is normally under strain tending to draw the nuts 27 and 29 toward one another, and the respective loops of said coiled spring are spaced apart a substantially uniform distance and are under tension to maintain their spaced relation. Any adjustment of the shaft 32 and nuts 27 and 29 thereon tends to increase or decrease the space between respective loops of the spring 26. Each of the pins 25 is in contact with one face of a loop of said spring 26, while the inner end of the respective pins 44 carried by the respective sleeves 20 are in like manner in contact with the opposite face of the same spring loop and opposite one another as shown in Fig. 3. The pins 25 and 44 project inwardly from the sleeves 20 in pairs through the slot 15 to engage in pairs upon opposite sides of said loops of spring 26, to thereby slide or adjust the sleeves 20 and knives 21 endwise of the tube 15, and to variously space and retain the knives 21 uniform distances apart from one another substantially between the limits shown in Figs. 1 and 2. The tension on the spring 26 insures the knives taking and retaining their adjusted positions. After the adjustments have been made the handle 42 is detached until again required for use.

By adjusting or spacing the blades 21 I am enabled to readily cut or score sheets of candy or similar substance into squares or rectangular blocks of practically any desired size and shape within the range of adjustment of the knives, and to readily and quickly change the adjustment as may be required.

The apparatus herein shown and described is capable of considerable modification within the scope of the claims without departing from the spirit of my invention.

What I claim is:

1. A candy cutter comprising a cylindrical axle, a plurality of disk-shaped cutters mounted and adjustable endwise upon said axle and spaced at intervals longitudinally thereof, a coiled spring carried by said axle under tension and to different loops of which spring said respective cutter disks are attached, and means to vary the tension upon said spring to thereby adjust said cutter disks to different positions endwise of said axle and to different relative spaced relations.

2. A candy cutter comprising a tubular axle, having a slot longitudinally thereof, a plurality of disk-shaped cutters mounted and adjustable endwise upon said axle and spaced at intervals longitudinally thereof, a coiled spring carried within said axle having its ends held in fixed relation to the axle and the middle portion of said spring under tension, means connecting said cutter disks with different loops of said spring through the slot in said tubular axle, and means adjustable to vary the tension on said spring to thereby shift said cuter disks endwise of said axle and to vary the spaced relation of said cutter disks one to another.

3. A candy cutter comprising a tubular axle, having a slot longitudinally thereof, a plurality of collars mounted upon and adjustable endwise of said axle, a plurality of disk shaped cutters mounted respectively upon said collars and spaced at intervals longitudinally of said axle, a coiled spring carried within said axle, a pair of nuts located respectively near opposite ends of and within said axle and to which opposite ends of said spring are rigidly attached, said nuts being non-rotatably adjustable endwise of said axle, a screw rod journaled near opposite ends within said axle and held against movement endwise within said axle, said nuts being engaged respectively by means of right and left hand threads with said screw rod, and means to rotate said screw rod relative to said axle from the exterior of said axle to shift said cutter disks endwise of said axle and into different relative spaced relation.

4. A candy cutter comprising a tubular axle having a slot longitudinally thereof, a plurality of collars mounted upon and adjustable endwise of said axle, a plurality of disk shaped cutters mounted respectively upon said collars and spaced at uniform intervals longitudinally of said axle, a coiled spring carried within said axle, a pair of nuts located respectively near opposite ends of and within said axle and to which opposite ends of said spring are rigidly attached, said nuts being non-rotatably adjustable endwise of said axle, a screw rod journaled near opposite ends within said axle and held against movement endwise within said axle, said nuts being engaged respectively by means of right and left hand threads with said screw rod, and means to rotate said screw rod relative to said axle from the exterior of said axle to shift said cutter disks endwise of said axle and into different relative and uniform spaced relation.

In testimony whereof I have affixed my signature.

EDMUND W. ROBERTS.